United States Patent
Chang et al.

(10) Patent No.: US 8,412,879 B2
(45) Date of Patent: Apr. 2, 2013

(54) HYBRID IMPLEMENTATION FOR ERROR CORRECTION CODES WITHIN A NON-VOLATILE MEMORY SYSTEM

(75) Inventors: Robert C Chang, Danville, CA (US); Bahman Qawami, San Jose, CA (US); Farshid Sabet-Sharghi, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 2428 days.

(21) Appl. No.: 10/678,893

(22) Filed: Oct. 2, 2003

(65) Prior Publication Data

US 2004/0083333 A1 Apr. 29, 2004

Related U.S. Application Data

(60) Provisional application No. 60/421,911, filed on Oct. 28, 2002.

(51) Int. Cl.
*G06F 12/00* (2006.01)
*G06F 13/00* (2006.01)
*G06F 13/28* (2006.01)

(52) U.S. Cl. ...................................................... 711/103

(58) Field of Classification Search .................. 711/103; 714/701
See application file for complete search history.

(56) References Cited

U.S. PATENT DOCUMENTS

| | | | |
|---|---|---|---|
| 4,785,452 A | 11/1988 | Petz et al. ........................ | 371/38 |
| 5,222,109 A | 6/1993 | Pricer ........................... | 377/24.1 |
| 5,228,046 A * | 7/1993 | Blake et al. .................... | 714/761 |
| 5,297,148 A | 3/1994 | Harari et al. .................. | 371/10.2 |
| 5,388,083 A | 2/1995 | Assar et al. ..................... | 365/218 |
| 5,438,573 A | 8/1995 | Mangan et al. ............... | 371/10.3 |
| 5,568,439 A | 10/1996 | Harari ............................. | 365/218 |
| 5,598,370 A | 1/1997 | Niijima et al. ........... | 365/185.33 |
| 5,603,001 A * | 2/1997 | Sukegawa et al. ............. | 711/103 |
| 5,754,565 A * | 5/1998 | Mo et al. ........................ | 714/769 |
| 5,835,935 A | 11/1998 | Estakhri et al. ............... | 711/103 |
| 5,845,313 A | 12/1998 | Estakhri et al. ............... | 711/103 |
| 5,860,082 A | 1/1999 | Smith et al. .................... | 711/103 |
| 5,907,856 A | 5/1999 | Estakhri et al. ............... | 711/103 |
| 5,924,113 A | 7/1999 | Estakhri et al. ............... | 711/103 |

(Continued)

FOREIGN PATENT DOCUMENTS

| JP | 62-283496 | 12/1987 |
|---|---|---|
| JP | 62-283497 | 12/1987 |

(Continued)

OTHER PUBLICATIONS

Kim, Jesung et al., "A Space-Efficient Flash Translation Layer for Compactflash Systems", IEEE Transactions on Consumer Electronics, vol. 48, No. 2, May 2002.

*Primary Examiner* — Sheng-Jen Tsai
(74) *Attorney, Agent, or Firm* — Brinks Hofer Gilson & Lione

(57) ABSTRACT

Methods and apparatus for using different error correction code algorithms to encode and to decode contents of blocks within a non-volatile memory are disclosed. According to one aspect of the present invention, a method for storing data within a non-volatile memory includes identifying a first block into which the data is to be stored, and obtaining an indicator associated with the first block. A determination may then be made regarding whether the indicator indicates that the data is to be encoded using a first algorithm. The data is encoded using the first algorithm when it is determined that the data is to be encoded using the first algorithm, after which point the data encoded using the first algorithm is written into the first block.

24 Claims, 10 Drawing Sheets

U.S. PATENT DOCUMENTS

| | | | | |
|---|---|---|---|---|
| 5,956,743 | A * | 9/1999 | Bruce et al. | 711/103 |
| 5,961,660 | A | 10/1999 | Capps, Jr. et al. | 714/763 |
| 6,000,006 | A * | 12/1999 | Bruce et al. | 711/103 |
| 6,016,275 | A | 1/2000 | Han | 365/185.29 |
| 6,041,001 | A * | 3/2000 | Estakhri | 365/200 |
| 6,081,447 | A | 6/2000 | Lofgren et al. | 365/185.02 |
| 6,085,339 | A | 7/2000 | Jeddeloh | 714/52 |
| 6,115,785 | A | 9/2000 | Estakhri et al. | 711/103 |
| 6,125,435 | A | 9/2000 | Estakhri et al. | 711/201 |
| 6,182,239 | B1 * | 1/2001 | Kramer | 714/5 |
| 6,230,233 | B1 | 5/2001 | Lofgren et al. | 711/103 |
| 6,260,156 | B1 | 7/2001 | Garvin et al. | 714/8 |
| 6,311,290 | B1 * | 10/2001 | Hasbun et al. | 714/15 |
| 6,426,893 | B1 | 7/2002 | Conley et al. | 365/185.11 |
| 6,487,685 | B1 * | 11/2002 | Stuart Fiske et al. | 714/701 |
| 6,747,827 | B1 * | 6/2004 | Bassett et al. | 360/53 |
| 6,834,331 | B1 * | 12/2004 | Liu | 711/156 |
| 6,961,890 | B2 * | 11/2005 | Smith | 714/763 |
| 6,970,890 | B1 * | 11/2005 | Bruce et al. | 707/202 |
| 2001/0029564 | A1 * | 10/2001 | Estakhri et al. | 711/103 |
| 2001/0042230 | A1 * | 11/2001 | Williams et al. | 714/703 |
| 2002/0008928 | A1 * | 1/2002 | Takahashi | 360/53 |
| 2002/0032891 | A1 * | 3/2002 | Yada et al. | 714/766 |
| 2004/0228197 | A1 * | 11/2004 | Mokhlesi | 365/232 |

FOREIGN PATENT DOCUMENTS

| | | |
|---|---|---|
| JP | 06-187248 A | 7/1994 |
| JP | 11-073797 A | 3/1999 |
| JP | 2000-020252 A | 1/2000 |
| JP | 2002-091831 A | 3/2002 |
| WO | 01/22232 A1 | 3/2001 |

* cited by examiner

HYBRID IMPLEMENTATION FOR ERROR CORRECTION CODES WITHIN A NON-VOLATILE MEMORY SYSTEM

The present invention claims priority of U.S. Provisional Patent Application No. 60/421,911, filed Oct. 28, 2002, which is hereby incorporated by reference in its entirety.

CROSS REFERENCE TO RELATED APPLICATIONS

The present invention is related to co-pending U.S. patent application Ser. Nos. 10/281,739, 10/281,823, 10/281,670, 10/281,824, 10/281,631, 10/281,855, 10/281,762, 10/281,696, 10/281,626, and 10/281,804, as well as U.S. Provisional Patent Application Nos. 60/421,910, 60/421,725, 60/421,965, 60/422,166, and 60/421,746, each filed on Oct. 28, 2002, which are each incorporated herein by reference in their entireties.

BACKGROUND OF THE INVENTION

1. Field of Invention

The present invention relates generally to mass digital data storage systems. More particularly, the present invention relates to systems and methods for enabling algorithms used to encode data that is to be written into blocks of a non-volatile memory to be dynamically switched.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller components. Typically, a flash memory chip set may be arranged to be assembled into an embedded system. The manufacturers of such assemblies or host systems typically acquire flash memory in component-form, as well as other components, then assemble the flash memory and the other components into a host system.

Often, in order to assure the accuracy of data stored in physical blocks of a flash memory, an error correction code (ECC) algorithm, or an error checking and correction code algorithm, may be used to encode data for storage, and to decode the stored data. Typically, ECC algorithms use dedicated circuitry or software to encode and to decode the data. Many ECC algorithms or methods may add a parity bit or parity bits which may be used to both detect and to correct errors associated with stored data.

Some ECC algorithms that are used to encode and to decode data for storage are known as 1-bit ECC algorithms and 2-bit ECC algorithms. 1-bit ECC algorithms enable a set of symbols to be represented such that if one bit of the representation is incorrect, e.g., is flipped, the symbols will be corrected, and if two bits are incorrect, e.g., iare flipped, the symbols may still be correctly identified. 2-bit ECC algorithms enable a set of symbols to be represented such that if two bits of the representation are flipped or otherwise incorrect, the two bits will be corrected, and if more than two bits are flipped, the symbols may still be correctly identified.

In general, the use of a 2-bit ECC algorithm may be preferred to a 1-bit ECC algorithm due to the ability to of a 2-bit ECC algorithm to detect more than two bad bits and to correct two bits, while a 1-bit ECC algorithm may detect two bad bits and to correct one bit. However, the implementation of a 2-bit ECC algorithm, while providing increased error correction capabilities to stored data, generally involves more calculations and, hence, more computational overhead than the implementation of a 1-bit ECC algorithm. When more computational overhead is required, more power, e.g., battery power, may be consumed by a non-volatile memory. As a result, the overall performance of a memory system may be compromised, particularly since the integrity of data that is stored in blocks which have been erased a relatively low number of times is generally relatively high.

To reduce the computational and power requirements associated with implementing a 2-bit ECC algorithm, some systems may use 1-bit ECC algorithms to encode and to decode data. 1-bit ECC algorithms, however, are often less accurate than 2-bit ECC algorithms. Further, as blocks into which data is stored near the end of their usable lives, the data stored in such blocks is more likely to contain errors. As such, when 1-bit ECC algorithms are used to encode data stored in blocks which have been erased a relatively high number of times and to decode such data, the integrity of the data may be compromised, and the performance associated with the blocks may be adversely affected.

Therefore, what is needed is a method and an apparatus which enables the performance of blocks which have been erased a relatively high number of times to be improved without requiring relatively high computational overhead and performance penalties to encode and to decode data which are stored in blocks that have been erased a relatively low number of times. That is, what is desired is a method and an apparatus that enables contents of blocks to be encoded using different ECC algorithms which may be selected based upon the number of times the blocks have been erased.

SUMMARY OF THE INVENTION

The present invention relates to a system and a method for using different error correction code algorithms to encode and to decode contents of blocks within a non-volatile memory. According to one aspect of the present invention, a method for storing data within a non-volatile memory includes identifying a first block into which the data is to be stored, and obtaining an indicator associated with the first block. A determination may then be made regarding whether the indicator indicates that the data is to be encoded using a first algorithm. The data is encoded using the first algorithm when it is determined that the data is to be encoded using the first algorithm, after which point the data encoded using the first algorithm is written into the first block.

In one embodiment, the method also includes encoding the data using a second algorithm when it is determined that the data is not to be encoded using the first algorithm, and writing the data encoded using the second algorithm into the first block. In such an embodiment, the first algorithm may be a 1-bit error correction code (ECC) algorithm and the second algorithm may be a 2-bit ECC algorithm.

By enabling data stored in blocks of a non-volatile memory system to be encoded using different ECC algorithms on a block-by-block basis, some blocks within the memory system may be encoded using a 1-bit ECC algorithm while other blocks may be encoded using a 2-bit ECC algorithm. A 1-bit ECC algorithm, or a less calculation-intensive algorithm, is used to encode data that is to be stored into blocks which have not been through a relatively high number of erase operations, while a 2-bit ECC algorithm, or a more calculation-intensive algorithm, is used to encode data that is to be stored into blocks which have been through a relatively high number of erase operations. Since a 2-bit ECC algorithm generally allows data to be encoded and decoded more accurately than a 1-bit ECC algorithm, using a 2-bit ECC algorithm to encode data to be stored on blocks which are nearing the end of their usability enables the performance associated with the blocks to be improved. When a 1-bit ECC algorithm is not used when a block is not near the end of its usability, the number of calculations needed to store and to read data from such a block may be reduced, thereby allowing the overall speed of read and write processes to be improved and reducing power requirements associated with the memory system.

According to another aspect of the present invention, a method for reading data within a non-volatile memory of a memory system includes identifying a first block from which data is to be read, obtaining an indicator associated with the first block, and determining when the indicator indicates that the data stored in the first block has encoded using a first algorithm. The method also includes decoding the data using the first algorithm when it is determined that the data has been encoded using the first algorithm. In one embodiment, the method further includes decoding the data using a second algorithm when it is determined that the data has not been encoded using the first algorithm.

In another embodiment, the indicator is arranged to indicate when the block is a reclaimed block. When the block is a reclaimed block, the indicator is further arranged to indicate that the data has been encoded using the second algorithm. In still another embodiment, the indicator is arranged to indicate a number of times the block has been erased. In such an embodiment, determining when the indicator indicates that the data has been encoded using the first algorithm may also include determining when the indicator is less than a threshold value. When the indicator is less than the threshold value, the implication is that the data has been encoded using the first algorithm.

According to still another aspect of the present invention, a memory system includes a non-volatile memory which includes a first block and a second block. The first block includes a first set of contents encoded using a first algorithm, and the second block includes a second set of contents encoded using a second algorithm. The non-volatile memory also includes a data structure, e.g., an erase count block, that is arranged to indicate that the first set of contents is encoded using the first algorithm and that the second set of contents is encoded using the second algorithm. The memory system further includes code devices for accessing the data structure. Such code devices include code devices for determining that the first set of contents is encoded using the first algorithm and code devices for determining that the second set of contents is encoded using the second algorithm.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation a memory device, e.g., memory device 120 of FIG. 1a.

DETAILED DESCRIPTION OF THE EMBODIMENTS

Figure 1A:
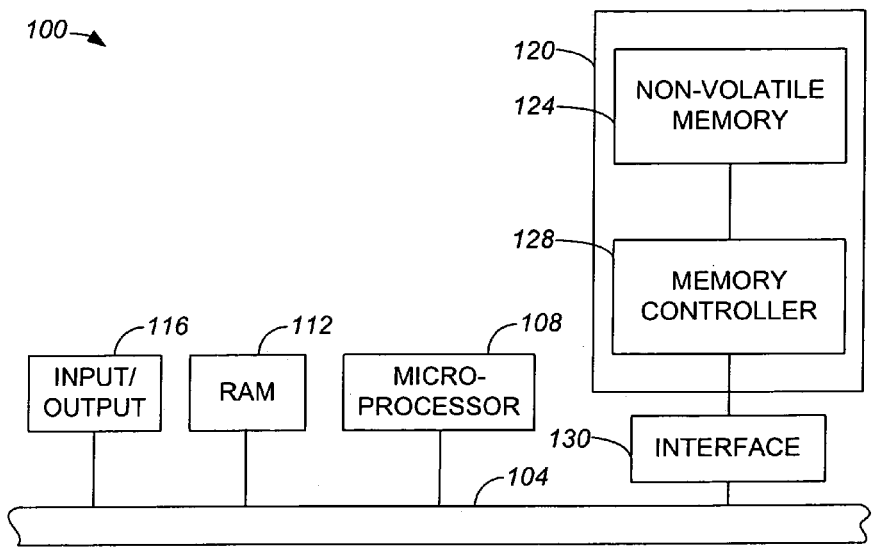
FIG. 1a is a diagrammatic representation of a general host system which includes a non-volatile memory.

An error correction code (ECC) algorithm such as either a 1-bit ECC algorithm or a 2-bit ECC algorithm is often used to encode data to be stored into a physical block of a non-volatile memory, and to decode stored data. The use of ECC algorithms generally enables the accuracy of data stored within a physical block to be improved. The use of a more calculation-intensive 2-bit ECC algorithm may be preferred to a less calculation-intensive 1-bit ECC algorithm due to the ability to of a 2-bit ECC algorithm to correct more erroneous bits that may be corrected using a 1-bit ECC algorithm. The implementation of a 2-bit ECC algorithm, however, while providing increased error correction capabilities, is more expensive than a 1-bit ECC algorithm in terms of a number of calculations and power requirements.

In many cases, when a block into which data is stored is relatively young and, hence, has not been subjected to a relatively high number of erase cycles, a 1-bit ECC algorithm may be sufficient to ensure the integrity of much of the data. As such, the implementation of a 2-bit ECC algorithm may not be necessary. However, as a block gets older and has been subjected to a relatively high number of erase cycles, a 1-bit ECC algorithm may not be sufficient to ensure a desired level of data integrity, and the use of a 2-bit ECC algorithm may significantly improve the integrity of the data.

A hybrid ECC implementation enables ECC algorithms used to encode and to decode data to be dynamically switched. Specifically, in one embodiment, data stored in blocks which have undergone a relatively low number of erase cycles may be encoded using a less calculation-intensive and less accurate algorithm, e.g., a 1-bit ECC algorithm, while blocks which have undergone a relatively high number of erase cycles may be encoded using a more calculation-intensive and more accurate algorithm, e.g., a 2-bit ECC algorithm. By dynamically determining when data is to be encoded using a more accurate algorithm such as a 2-bit ECC algorithm instead of a "default" algorithm, e.g., a less accurate algorithm such as a 1-bit ECC algorithm, the algorithm chosen to encode data to be stored in a particular block may be selected depending upon characteristics of the particular block, and the more accurate algorithm may effectively be used when it would provide a substantial benefit. For example, if a block is nearing the end of its projected usable life, using a 2-bit ECC algorithm to encode data to be stored into the block may improve the accuracy or integrity of the data stored in the block, and may also allow the usable life of the block to be potentially extended. Further, by using a less calculation-intensive algorithm to encode data to be stored in blocks which are not nearing the end of their usable lives, the power requirements of an overall memory system may be reduced, thereby improving the endurance of the overall memory system.

In one embodiment, a threshold erase count or a threshold number of erase cycles may be used as an indicator of whether to use a less calculation-intensive and lower accuracy ECC algorithm or a more calculation-intensive and higher accuracy ECC algorithm to encode data to be written into a block. When a comparison of the number of erase cycles undergone by the block with the threshold number indicates that the block has undergone more erase cycles than the threshold number, then the higher accuracy ECC algorithm may be used, as the block may be considered to be near the end of its usable life.

Flash memory systems or, more generally, non-volatile memory devices which may use a hybrid ECC implementation that allows blocks within a system to be encoded using different ECC algorithms generally include flash memory, e.g., NAND or MLC NAND, cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 1c. Referring to FIG. 1a, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 1b.

Non-volatile memory 124, e.g., flash memory such as NAND flash memory or an MLC NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 1B:
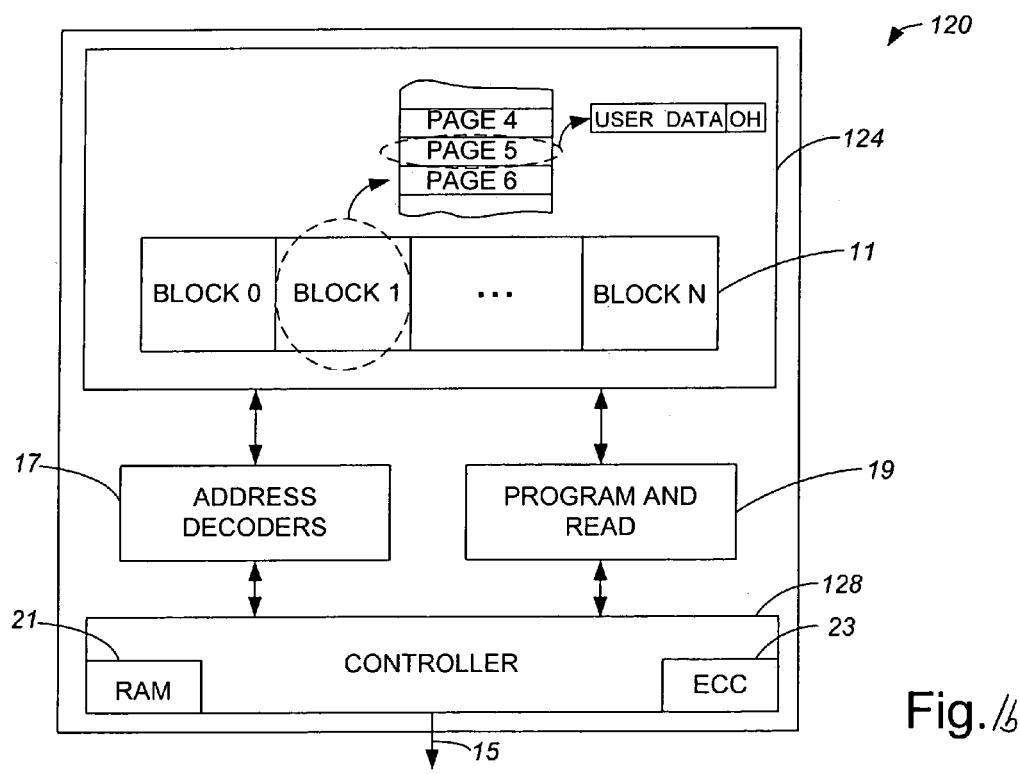

With reference to FIG. 1b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device such as an embedded MLC NAND memory, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 1a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0-N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 1b, one sector includes user data and overhead data. Overhead data typically includes an ECC that has been calculated from the user data of the sector. A portion 23 of the control system 128 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, or redundant data, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 1C:
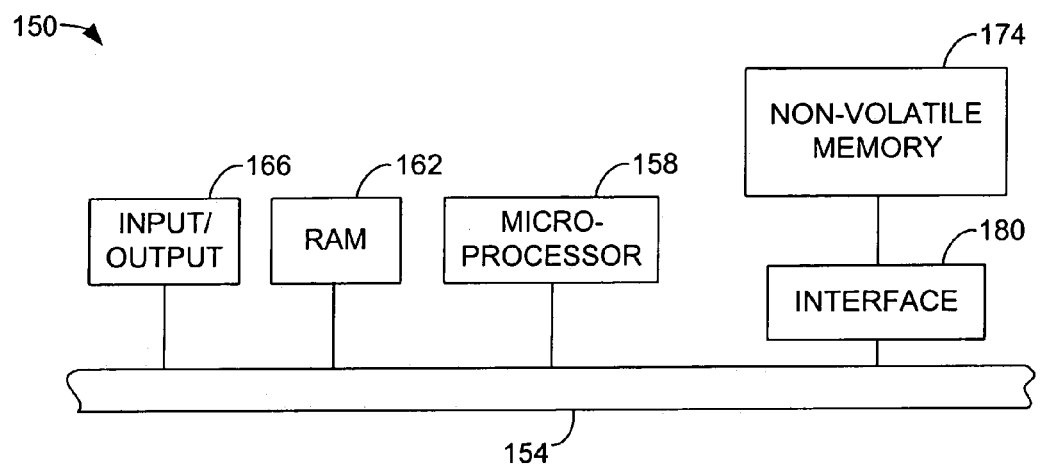
FIG. 1c is a diagrammatic representation of a host system which includes an embedded non-volatile memory.

In one embodiment, non-volatile memory such as an MLC NAND memory is embedded into a system, e.g., a host system. FIG. 1c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may serve as a controller that runs code devices, i.e., software code devices or firmware code devices, which allow non-volatile memory 174 to be controlled. Such code devices, which will be described below, may enable physical blocks in non-volatile memory 174 to be addressed, and may enable information to be stored into, read from, and erased from the physical blocks.

Figure 2A:
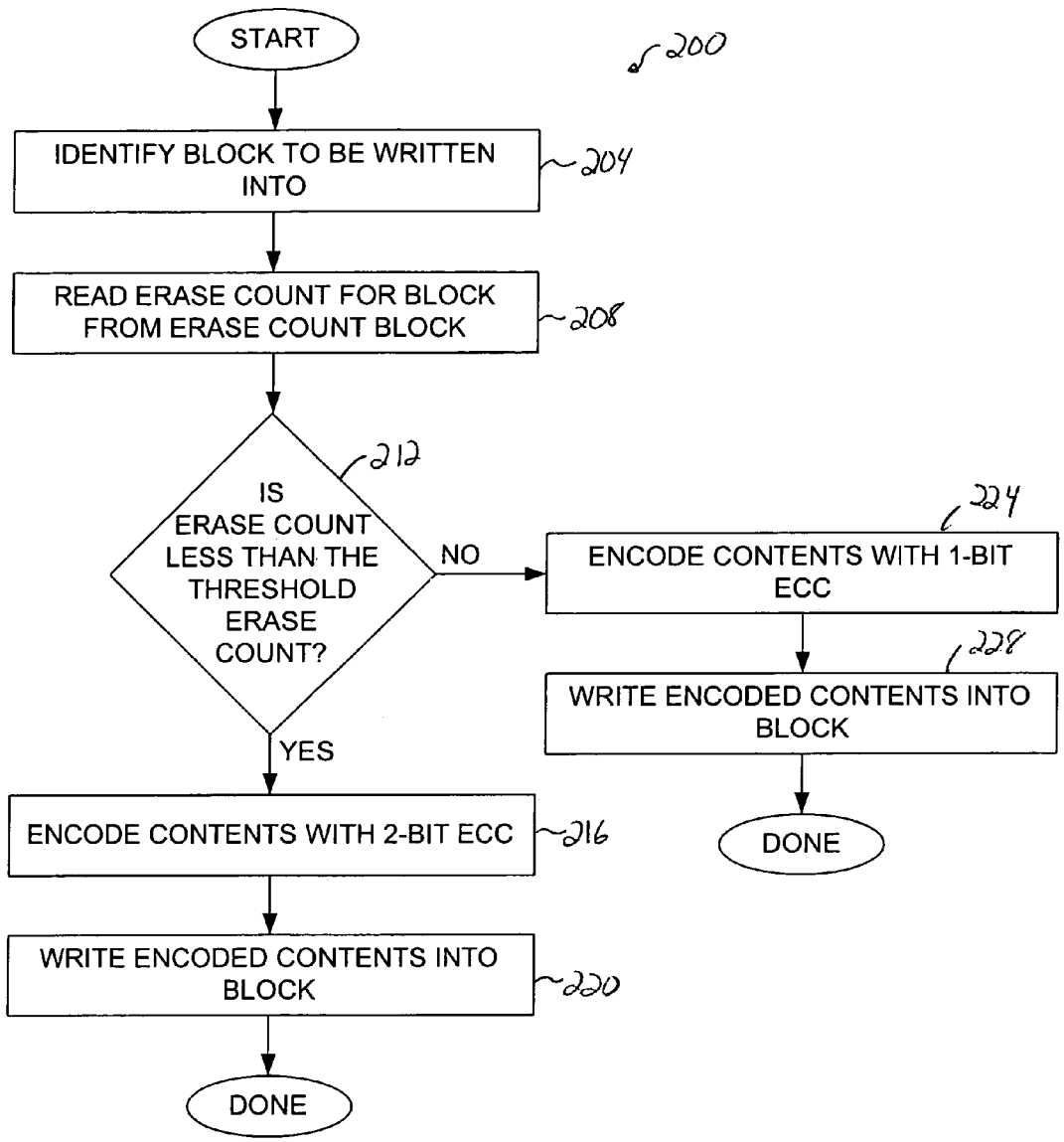
FIG. 2a is a process flow diagram which illustrates a method of writing user data into a block using either a 1-bit or 2-bit ECC in accordance with an embodiment of the present invention.

Within a memory system which uses a hybrid ECC implementation, before data may be written into a block, information associated with the block is typically obtained and studied to determine an appropriate ECC algorithm to use to encode the data that is to be written into the block. With reference to FIG. 2a, the steps with writing user data into a block using either a 1-bit or 2-bit ECC will be described in accordance with an embodiment of the present invention. A process 200 of writing data begins at step 204 in which a block that is to be written into is identified. The block may be an unused block, e.g., a block obtained from a spare block pool, or the block may be a block that is currently in use and is arranged to accept additional contents. Once the block is identified, the erase count for the block is read from an erase count block in step 208. An erase count block, as described in co-pending U.S. patent application Ser. No. 10/281,626, is a data structure that is stored in non-volatile memory, and contains erase counts associated with substantially all usable blocks within a non-volatile memory. An erase count generally indicates a number of times a given block has been erased and, hence, provides an indication of the lifetime of the block.

After the erase count for the block is read, it is determined in step 212 whether the erase count is less than a threshold erase count. A threshold erase count may be an erase count that is specified by a user of a non-volatile memory system, or the threshold erase count may be a system parameter. The value of a threshold erase count may vary widely. By way of example, in an embodiment in which a block is likely to no longer be usable after the block has been erased approximately 10,000 times, a threshold erase count may be set at a value of between approximately 9,500 and approximately 9,800. More generally, a threshold erase count may be set at a value that is between approximately two percent and approximately five percent less than the erase count which is considered to determine the lifetime of a block.

If it is determined in step 212 that the erase count of the block is less than the threshold erase count, then the indication is that contents, e.g., user data, to be stored into the block are to be encoded using a 1-bit ECC algorithm. Accordingly, in step 224, the contents that are to be stored into the block are encoded using a 1-bit ECC algorithm. Once the contents are encoded, the encoded contents are written into the block in step 228, and the process of writing contents into a block is completed.

Returning to step 212, if the determination is that the erase count is not less than the threshold erase count, then the implication is that the block is nearing the end of its usable life. As such, the contents to be stored into the block are encoded in step 216 using a 2-bit ECC algorithm. After the block contents are encoded, then in step 220, the encoded contents are written into the block, and the process of writing contents into a block is completed.

Figure 2B:
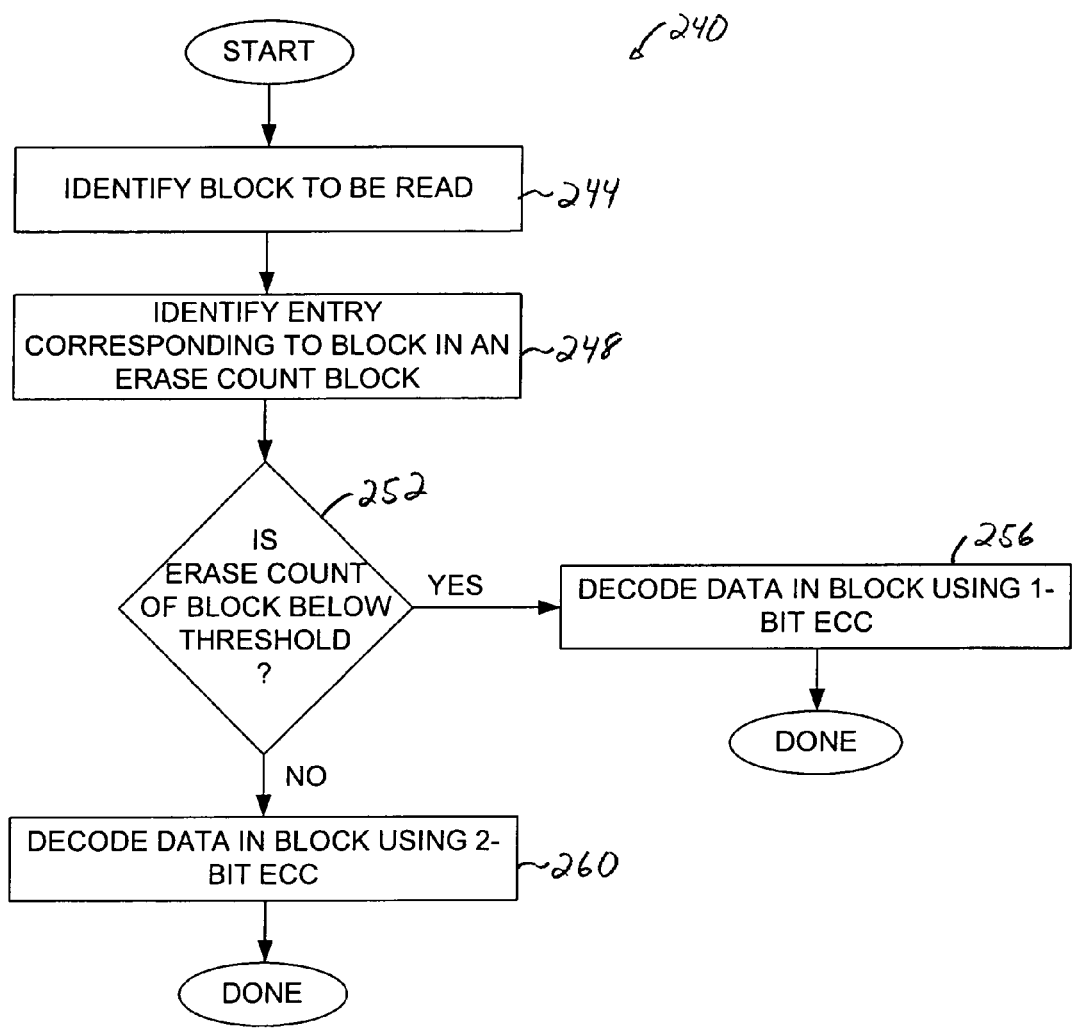
FIG. 2b is a process flow diagram which illustrates one method of reading contents from a block within a system in which the contents may either be encoded using a 1-bit ECC algorithm or a 2-bit ECC algorithm in accordance with an embodiment of the present invention.

When contents of blocks, i.e., physical blocks, within a memory system may be encoded using either 1-bit or 2-bit ECC algorithms, before the contents may be accurately decoded, a determination is made regarding which ECC algorithm was used to encode the contents. In other words, a process of reading contents of blocks generally includes identifying whether the contents were encoded using a 1-bit ECC algorithm or a 2-bit ECC algorithm. FIG. 2b is a process flow diagram which illustrates the steps associated with one method of reading contents from a block within a system in which the contents may either be encoded using a 1-bit ECC algorithm or a 2-bit ECC algorithm in accordance with an embodiment of the present invention. A process 240 of reading the contents of a block begins at step 244 in which a block to be read is identified. The block may be obtained, in general, from a pool of blocks which are currently in use, i.e., which are currently being used to store information. After the block is identified, an entry corresponding to the block is identified in an erase count block in step 248. Typically, the entry for the block in the erase count block includes an erase count for the block.

In step 252, it is determined if the erase count of the block is below an erase count threshold, or the threshold which determines substantially when the contents of a block are to be encoded using a 1-bit ECC algorithm or a 2-bit ECC algorithm. If it is determined that the erase count of the block is below the threshold, then the data in the block is decoded using a 1-bit ECC algorithm in step 256. Once the data is decoded using the 1-bit ECC algorithm, the process of reading contents from a block is completed. Alternatively, if it is determined in step 252 that the erase count is not below the threshold, then the indication is that the data was encoded using a 2-bit ECC algorithm. Accordingly, in step 260, the data in the block is decoded using a 2-bit ECC algorithm. After the data is decoded, the process of reading data from a block is completed.

During the course of operation of a memory system, in order to prolong the life of a non-volatile memory of the memory system, static blocks, or blocks which are rarely updated or erased, may be identified. Such static blocks may be identified as being unlikely to be updated and, hence, the contents of such static blocks may be copied into blocks with relatively high erase counts. By copying the contents of static blocks into blocks with relatively high erase counts, the static blocks may effectively be recycled for use. Further, storing the contents of static blocks into blocks with relatively high erase counts may prove to be an efficient use of the blocks with relatively high erase counts, since the contents are not likely to be updated and erased, thereby prolonging the life of the blocks with relatively high erase counts. The swapping of static blocks with blocks which have relatively high erase counts is discussed in co-pending U.S. patent application Ser. No. 10/281,739.

Figure 3:
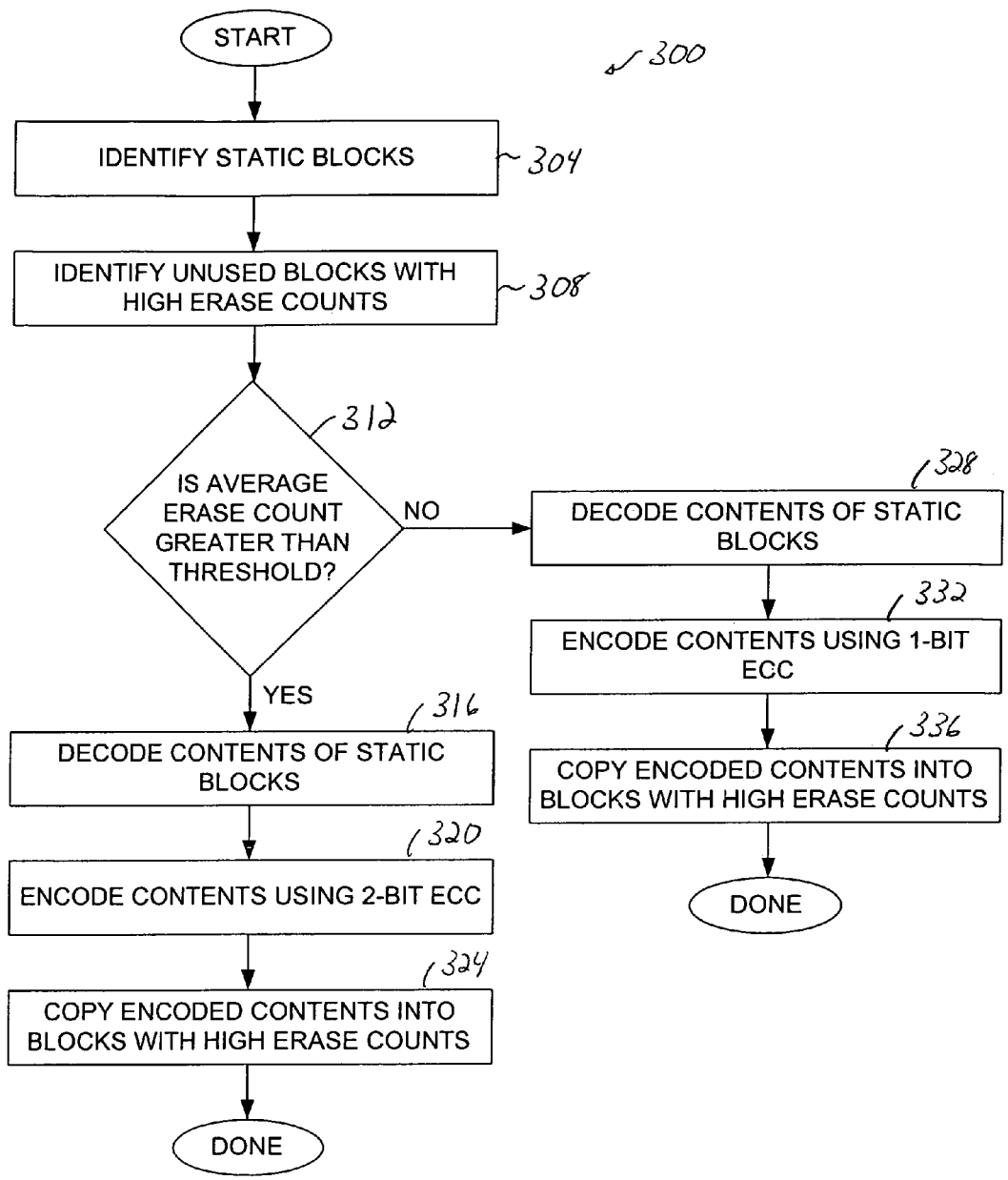
FIG. 3 is a process flow diagram which illustrates one method for initializing a memory system in which contents of blocks may be encoded using a hybrid ECC implementation in accordance with an embodiment of the present invention.

Often, the swapping of static blocks with blocks which have relatively high erase counts may be performed when a memory system is initialized, e.g., when a memory system is powered up after having been powered down. With reference to FIG. 3, one initialization process for a memory system in which contents of blocks may be encoded using either a 1-bit ECC algorithm or a 2-bit ECC algorithm will be described in accordance with an embodiment of the present invention. A process 300 of initializing a memory system includes identifying static blocks in step 304. Identifying static blocks may generally include identifying blocks which are effectively not actively being used. Once static blocks are identified, unused blocks with relatively high erase counts are identified in step 308. Typically, identifying the unused blocks with relatively high erase counts includes identifying a set of unused blocks which have the highest erase counts of all unused blocks associated with a non-volatile memory of the memory system.

After unused blocks with relatively high erase counts are identified, it is determined in step 312 whether the average erase count associated with blocks of the non-volatile memory is greater than an erase count threshold. An average erase count indicates an average number of times usable blocks within the non-volatile memory have been erased, and is discussed in co-pending U.S. patent application Ser. No. 10/281,823. If it is determined that the average erase count is not greater than the erase count threshold, then the indication is that the contents of the static block may be encoded for storage into the unused blocks with relatively high erase counts using a 1-bit ECC algorithm. As such, process flow proceeds to step 328 in which the contents of the static blocks are decoded. It should be appreciated that the steps associated with decoding or reading from the static blocks may be the steps described above with respect to FIG. 2b.

Upon decoding the contents of the static blocks, the decoded contents are encoded in step 332 using a 1-bit ECC algorithm. The encoded contents are then copied or otherwise stored into the unused blocks with the relatively high erase counts in step 336, and the process of initializing a memory system is completed.

Returning to step 312, if it is determined that that the average erase count is greater than the erase count threshold, then the indication is that the unused blocks with the relatively high erase counts are all likely to have erase counts which are higher than the erase count threshold. As such, process flow proceeds from step 312 to step 316 in which the contents of the static blocks are decoded using either a 1-bit ECC algorithm or a 2-bit ECC algorithm, as appropriate. Once the contents of the static blocks are decoded, the contents are encoded in step 320 using a 2-bit ECC algorithm. After the contents are encoded, the contents are copied or stored into the blocks with the relatively high erase counts in step 324, and the process of initializing a memory system is completed.

In one embodiment of the present invention, reclaimed blocks may be in use. That is, blocks which were previously considered to be unusable blocks may be reclaimed for use after a rigorous testing process, particularly in the event that a pool of spare, usable blocks is insufficient. The managing of blocks which are identified as being unusable and the reclaiming of blocks which are identified as being unusable are discussed in co-pending U.S. Provisional Patent Application No. 60/421,965. Rigorous testing processes may include testing blocks which have been identified as having growing defects, e.g., blocks which were previously usable but are no longer considered to be usable, by writing test contents into the blocks using a 2-bit ECC algorithm and reading test contents out of the blocks using a 2-bit ECC algorithm. If a block which was identified as having a growing defect passes a rigorous testing process, then the block may once again be considered to be usable. If used, such blocks, however, are generally written to and read from using a 2-bit ECC algorithm to improve the integrity of the contents stored in the blocks.

Figure 4A:
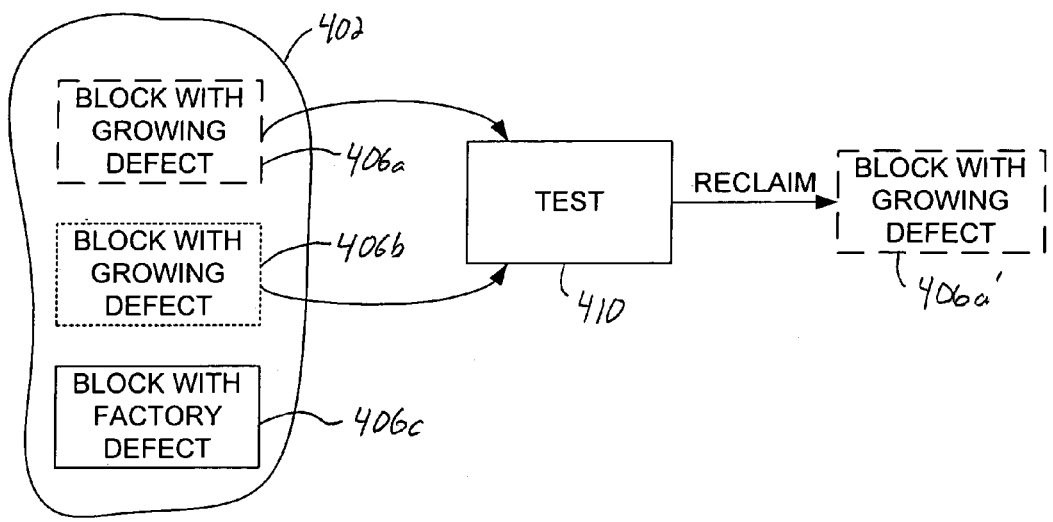
FIG. 4a is a diagrammatic block diagram representation of a process of reclaiming unusable blocks in accordance with an embodiment of the present invention.

FIG. 4a is a diagrammatic block diagram representation of a process of reclaiming unusable blocks in accordance with an embodiment of the present invention. A group or pool 402 of blocks 406 which are identified as being unusable are tested using a tester 410 when an attempt is made to reclaim at least some of the unusable blocks 406. The unusable blocks 406 may be identified in an erase count block as being unusable. Typically, blocks with factory defects such as block 406c are not tested for possible reclamation as such blocks are generally not reclaimable. Such blocks, e.g., block 406c, are often identified as being unusable by a manufacturer, and may also include blocks which have previously failed a reclamation process.

Blocks with growing defects such as blocks 406a, 406b may be subjected to testing by a tester 410 to determine if at least some such blocks may be usable. As shown, block 406a is reclaimed as block 406a'. By reclaiming block 406a as block 406a', the indication is, in the described embodiment, that block 406a' has passed an encoding and decoding test using a 2-bit ECC algorithm.

Figure 4B:
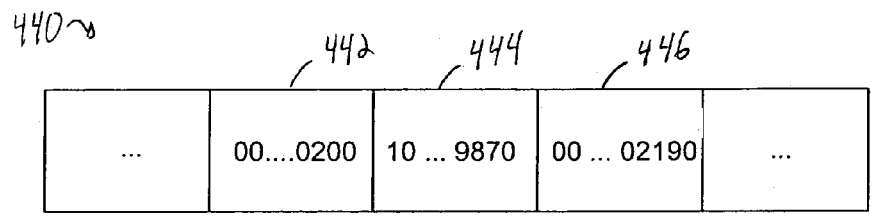
FIG. 4b is a diagrammatic representation of a portion of an erase count block in accordance with an embodiment of the present invention.

Once a block has been reclaimed, the block may be identified in an erase count block as having been reclaimed. FIG. 4b is a diagrammatic representation of a portion of an erase count block in accordance with an embodiment of the present invention. An erase count block 440 includes entries 442, 444, 446 which correspond to different physical blocks within a non-volatile memory. In the described embodiment, although the number of bytes in each entry 442, 444, 446 is approximately three, the number of bytes associated with each entry 442, 444, 446 may vary.

As shown, a most significant bit associated with entry 442 is set to '0' to indicate that block 442 is usable. The least significant bit or bits associated with entry 442 are the erase count for the block associated with entry 442. Hence, the block associated with entry 442 is identified as being usable, and has an erase count of 200. Typically, a HEX value may be used to indicate the erase count, although for ease of discussion, the erase count is shown as being alphanumeric. It should be understood that the bits in entry 442 may generally be organized in a variety of different manners, i.e., a bit other than the most significant bit may be set to indicate that the block associated with entry 442 is usable and a bits other than the least significant bits may be set to the erase count of the block.

A most significant bit in entry 444 identifies a block which corresponds to entry 444 as having been reclaimed. The least significant bit or bits of entry 444 identify the corresponding block as having an erase count of 9870.

Figure 5A:
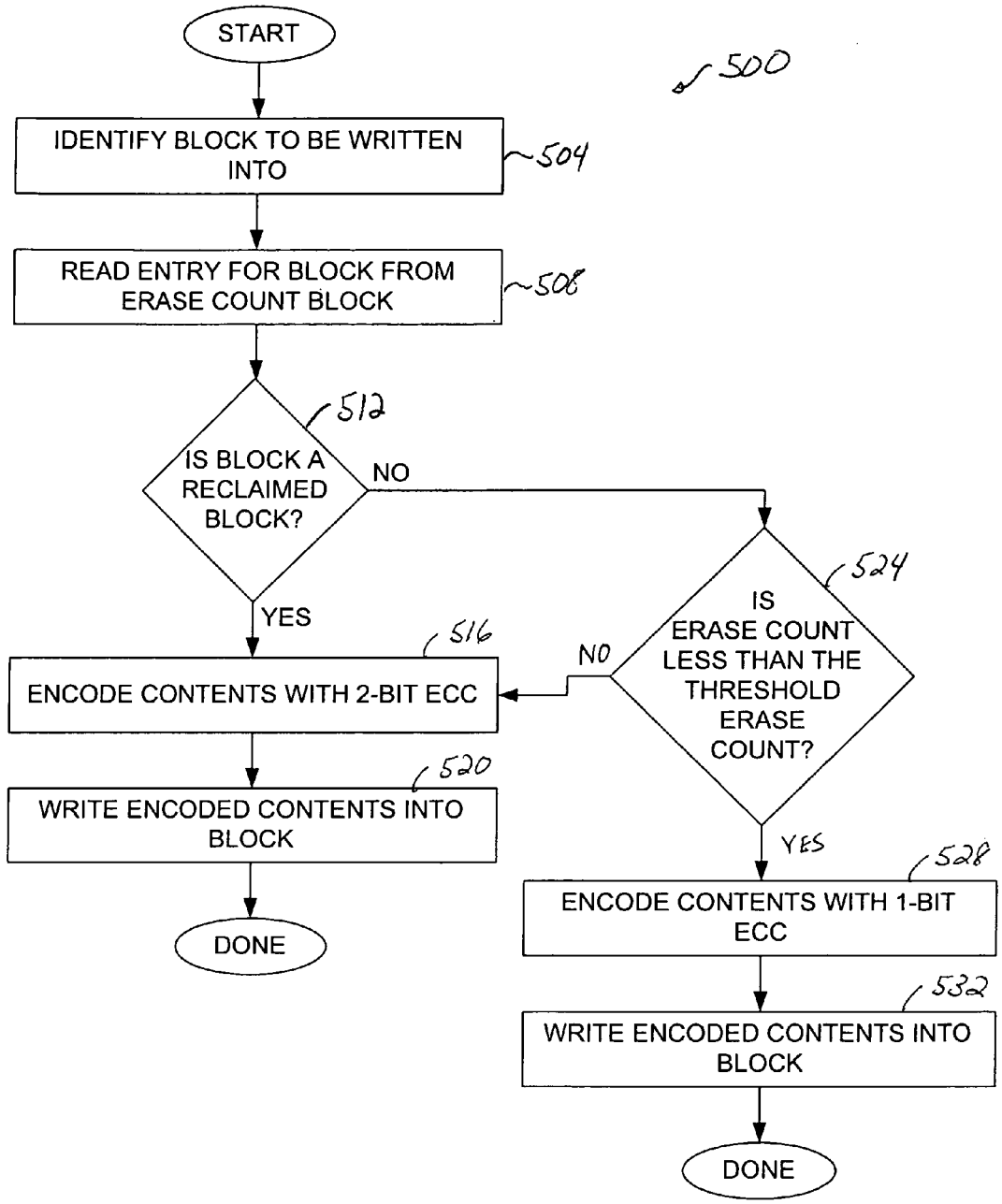
FIG. 5a is a process flow diagram which illustrates one method of writing to a block within a system in which there may be reclaimed blocks and data may be encoded using either a 1-bit ECC algorithm or a 2-bit ECC algorithm in accordance with an embodiment of the present invention.

As previously mentioned, when a reclaimed block is used to store data, the data stored in the reclaimed block is generally encoded using a 2-bit ECC algorithm to ensure that the integrity of the data, irregardless of whether the erase count of the reclaimed block is above an erase count threshold. Hence, when a block is to be written to or read from within a system in which there may be reclaimed blocks, the reclaimed blocks are identified. Referring next to FIG. 5a, one method of writing to a block within a system in which there may be reclaimed blocks and data may be encoded using either a 1-bit ECC algorithm or a 2-bit ECC algorithm will be described in accordance with an embodiment of the present invention. A process 500 of writing data begins at step 504 in which a block that is to be written to is identified. An entry which corresponds to the block is read from an erase count block in step 508. Typically, the entry includes an erase count for the block and an indication of whether the block has been reclaimed.

Once the entry which corresponds to the block is read in step 508, it is determined in step 512 whether the block is a reclaimed block. If it is determined that the block is a reclaimed block, then contents to be written to or stored in the block are encoded using a 2-bit ECC algorithm in step 516. After the contents are encoded, the encoded contents are written into the block in step 520, and the process of writing contents into a block is completed.

Returning to step 512, if it is determined that the block is not a reclaimed block, then process flow moves to step 524 in which it is determined if the erase count for the block, which may be read from the erase count block in step 508, is less than a threshold erase count. When it is determined that the erase count for the block is not less than the threshold erase count, then the indication is that a 2-bit ECC algorithm is to be used to encode the contents to be stored into the block identified in step 504. As such, process flow moves from step 524 to step 516 in which the contents are encoded using a 2-bit ECC algorithm.

Alternatively, if it is determined in step 524 that the erase count is not less than the threshold erase count, then the contents to be written into the identified block are encoded using a 1-bit ECC algorithm in step 528. The encoded contents are then stored or written into the block in step 532, and the process of writing contents into a block is completed.

Figure 5B:
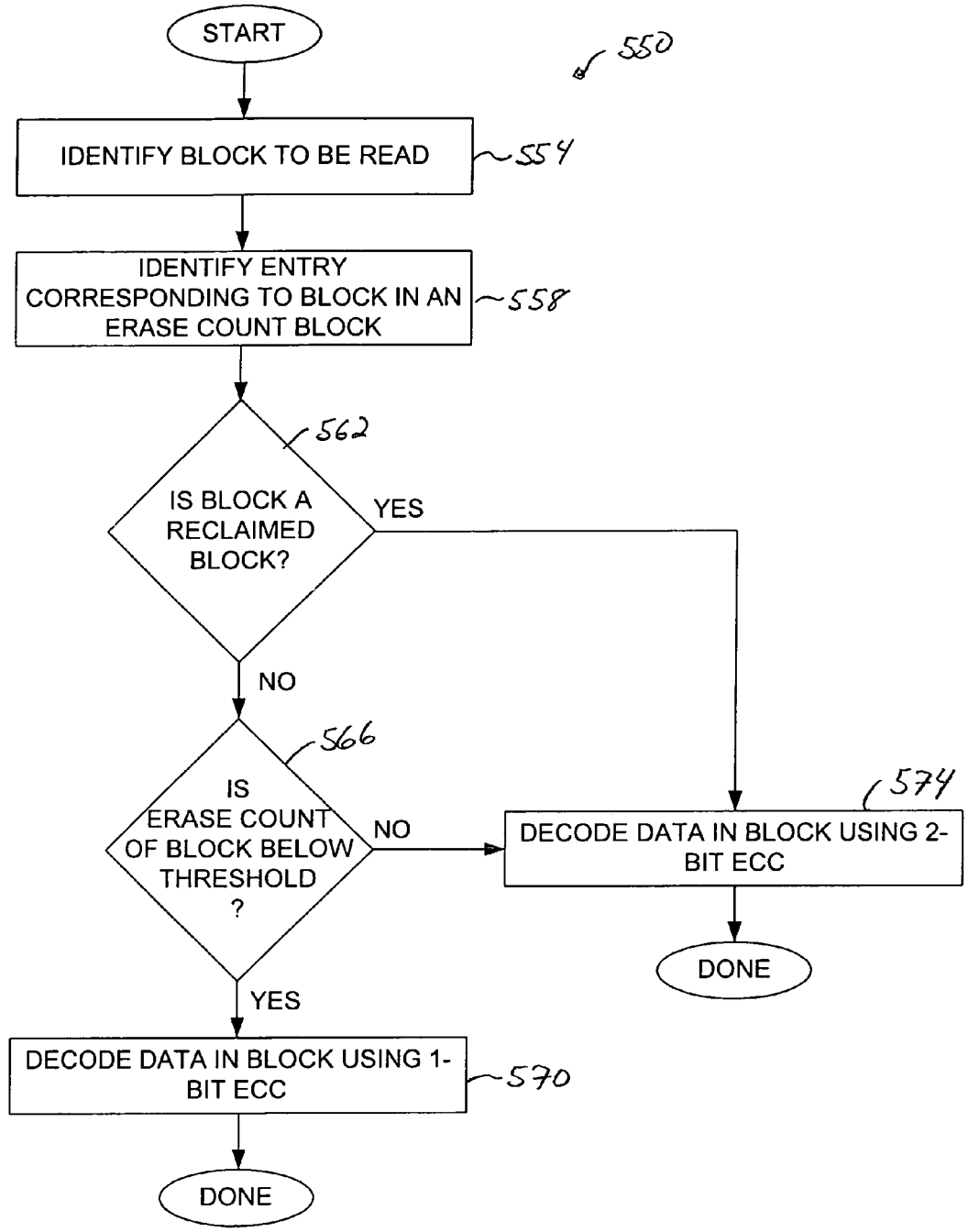
FIG. 5b is a process flow diagram which illustrates one method of reading contents from a block which may be a reclaimed block and may have contents that are encoded either using a 1-bit ECC algorithm or a 2-bit ECC algorithm in accordance with an embodiment of the present invention.

FIG. 5b is a process flow diagram which illustrates one method of reading contents from a block which may be a reclaimed block and may have contents that are encoded either using a 1-bit ECC algorithm or a 2-bit ECC algorithm in accordance with an embodiment of the present invention. A reading process 550 begins at step 554 in which a block with contents to be read is identified. An entry that corresponds to the block is then identified in an erase count block in step 558. The entry generally includes an indication of whether the block is a reclaimed block, as well as an erase count for the block.

After the entry corresponding to the block is identified, a determination is made in step 562 regarding whether the block is a reclaimed block. Typically, such a determination may be made by studying the entry identified or read from the erase count block in step 558. If it is determined that the block is a reclaimed block, then the contents stored in the block are decoded using a 2-bit ECC algorithm in step 574. Once the contents are decoded, the process of reading data or contents from a block is completed.

Alternatively, if it is determined in step 562 that the block is not a reclaimed block, then it is determined in step 566 whether the erase count of the block is below a threshold erase count. If it is determined that the erase count of the block is not below the threshold, then the indication is that the contents were encoded using a 2-bit ECC algorithm. As such, the data is decoded in step 574 using a 2-bit ECC algorithm. On the other hand, if it is determined that the erase count of the block is below the threshold, then the data is decoded in step 570 using a 1-bit ECC algorithm. After the data is decoded, the process of reading data or contents from a block is completed.

Figure 6:
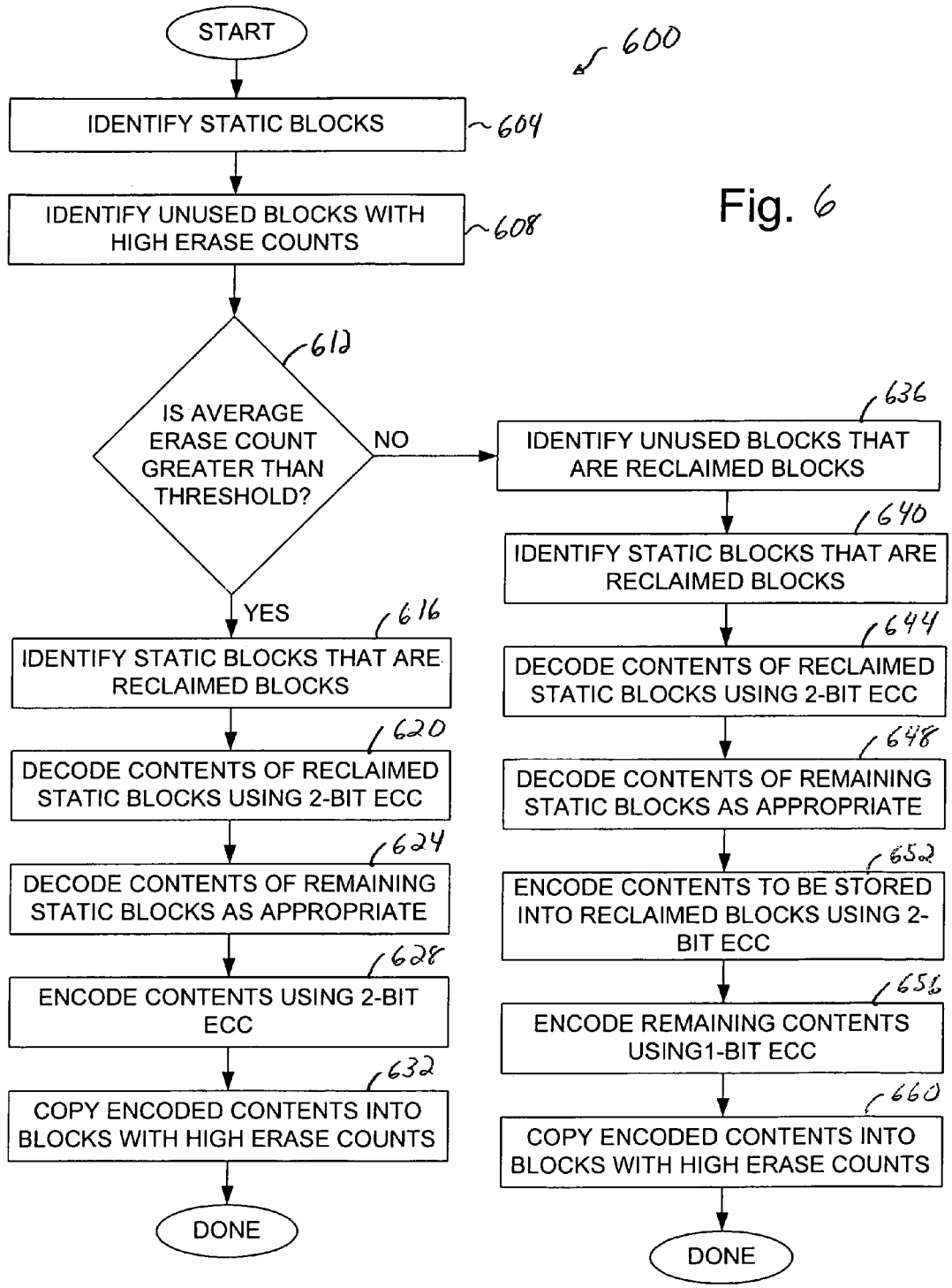
FIG. 6 is a process flow diagram which illustrates one method of initializing a memory system with a hybrid ECC implementation that includes reclaimed blocks in accordance with an embodiment of the present invention.

In general, a system initialization process for a system which allows for static block swapping and includes blocks which may be reclaimed is different from a system initialization process for a system which allows for static block swapping but does not account for reclaimed blocks. With reference to FIG. 6, one method of initializing a memory system with a hybrid ECC implementation that includes reclaimed blocks will be described in accordance with an embodiment of the present invention. An initialization process 600 begins at step 604 in which static blocks are identified. Once the static blocks are identified, unused blocks with relatively high erase counts are identified in step 608. The unused blocks with relatively high erase counts are generally arranged to be swapped with the static blocks such that the static blocks may be recycled or otherwise reused, while the contents of the static blocks are stored into the unused blocks with relatively high erase counts.

A determination is made in step 612 regarding whether the average erase count associated with the memory system, which may be obtained from an erase count block, is greater than an erase count threshold. If it is determined that the average erase count is greater than the threshold erase count, then in step 616, any static blocks that are reclaimed blocks are identified. Such an identification may be made either by studying redundant areas associated with the static blocks, or by studying associated entries in an erase count block.

After static blocks which have been reclaimed are identified, the contents of the reclaimed static blocks are decoded using a 2-bit ECC algorithm in step 620. Then, in step 624, the contents of the remaining static blocks are decoded as appropriate. That is, the contents of remaining static blocks which have erase counts that are less than the threshold erase count are decoded using a 1-bit ECC algorithm, while the contents of remaining static blocks which have erase counts that are more than the threshold erase count are decoded using a 2-bit ECC algorithm. Once all contents of static blocks are decoded, the contents are encoded using a 2-bit ECC algorithm in step 628, and the encoded contents are stored into or copied into the blocks with the relatively high erase counts in step 632. Upon copying the encoded contents into blocks, the system initialization process is completed.

Returning to step 612 and the determination of whether an average erase count is greater than a threshold erase count, when it is determined that the average erase count is not greater than the threshold erase count, then the indication is that the unused blocks with relatively high erase counts are likely to have erase counts which are less than the threshold erase count. As such, process flow moves from step 612 to step 636 in which unused blocks that are reclaimed blocks are identified. That is, the unused blocks with relatively high erase counts which have previously been reclaimed are identified. Once the unused blocks with relatively high erase counts that have previously been reclaimed are identified, any static blocks that are reclaimed blocks are identified in step 640.

From step 640, process flow proceeds to step 644 in which the contents of reclaimed static blocks are decoded using a 2-bit ECC algorithm. After the contents of the reclaimed static blocks are decoded, the contents of the remaining static blocks are decoded as appropriate in step 648. Typically, some of the static blocks may be decoded using a 1-bit ECC algorithm, while other static blocks may be decoded using a 2-bit ECC algorithm. Upon decoding the contents of the remaining static blocks, any contents that are to be stored into reclaimed unused blocks are encoded in step 652 using a 2-bit ECC algorithm. In step 656, the contents which are to be stored in unused blocks which have not previously been reclaimed are encoded using a 1-bit ECC algorithm. Once substantially all contents have been encoded, the encoded contents are copied into their intended unused blocks with relatively high erase counts in step 660, and the initialization process is completed.

Figure 7:
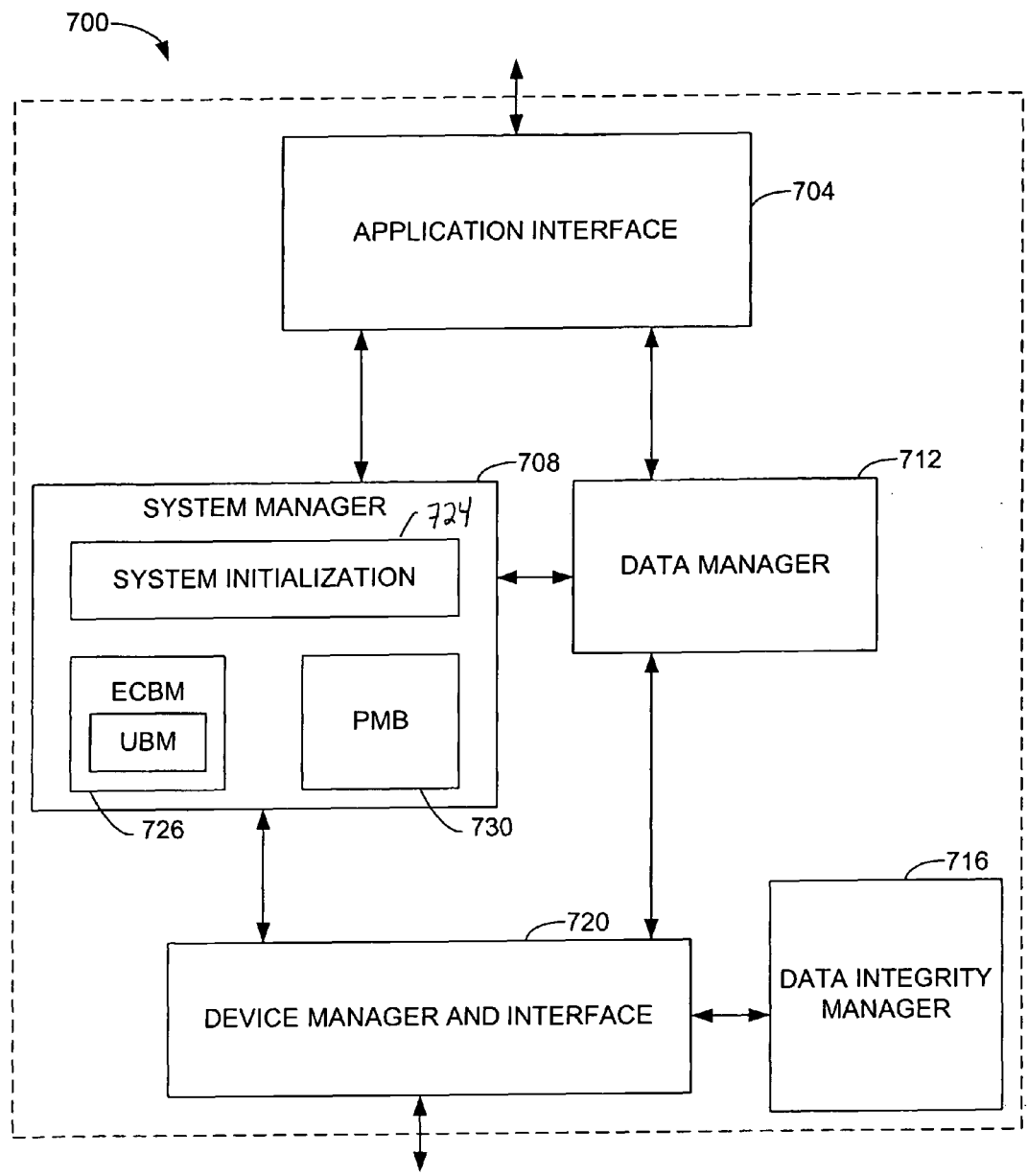
FIG. 7 is a diagrammatic block diagram representation of a system architecture in accordance with an embodiment of the present invention.

In general, the functionality associated with implementing a hybrid ECC implementation is provided in software, e.g., as program code devices, or as firmware to a host system which includes a non-volatile memory or non-volatile memory component. One embodiment of a suitable system architecture associated with the software or firmware provided to a host system is shown in FIG. 7. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 1a.

In general, application interface module 704 may be arranged to communicate with a non-volatile memory such as a flash memory (not shown) or, more generally, a media, to initialize the media during the course of an initialization, or system formatting, request. Application interface module 704 may also read from, as well as write to, a sector, a cluster, or a page associated with the media. Typically, in addition to communicating with a media, application interface module 704 is also in communication with system manager module 708 and data manager module 712.

System manager module 708 includes a system initialization submodule 724, an erase count block management submodule 726, and a power management block submodule 730. System initialization submodule 724 is generally arranged to enable an initialization request to be processed, and typically communicates with erase count block management submodule 726. System initialization module 724 is also arranged to resolve a one-to-many logical-to-physical block assignment.

Erase count block management submodule 726 includes functionality to cause erase counts of blocks to be stored, and functionality to cause an average erase count to be calculated, as well as updated, using individual erase counts. In other words, erase count block management submodule 726 effectively allows erase counts to be cataloged and allows an average erase count to be maintained. Further, in one embodiment, erase count block management submodule 726 also substantially synchronizes the erase count of substantially all blocks in an erase count block during a initialization request of an overall system. While erase count block management submodule 726 may be arranged to cause an average erase count to be stored in an erase count block, it should be appreciated that power management block submodule 730 may instead be used to enable the average erase count to be stored.

In addition to being in communication with application interface module 704, system manager module 708 is also in communication with data manager module 712, as well as device manager and interface module 720. Data manager module 712, which communicates with both system manager module 708 and application interface module 704, may include functionality to provide sector mapping which effectively translates logical sectors into physical sectors. That is, data manager module 712 is arranged to map logical blocks into physical blocks. Data manager module 712 may also include functionality associated with operating system and file system interface layers, and enables groups within blocks to be managed, as described in co-pending U.S. patent application Ser. No. 10/281,855, which is incorporated herein by reference in its entirety. In one embodiment, data manager module 712 may be arranged to enable a substantially out-of-sequence write process to occur.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

Although only a few embodiments of the present invention have been described, it should be understood that the present invention may be embodied in many other specific forms without departing from the spirit or the scope of the present invention. By way of example, a 1-bit ECC algorithm has been described as being suitable for use to encode contents of a block with an erase count that is lower than an erase count threshold while a 2-bit ECC algorithm has been described as being suitable for use to encode contents of a block with an erase count that is higher than an erase count threshold. It should be appreciated, however, that in some embodiments, a 2-bit ECC algorithm may be used to encode contents of a block with an erase count that is lower than an erase count threshold and an algorithm with even higher accuracy than a 2-bit ECC algorithm, e.g., a 3-bit ECC algorithm, may be used to encode contents of a block with an erase count that is higher than the erase count threshold.

Additionally, while ECC algorithms have generally been described as being 1-bit ECC algorithms or 2-bit ECC algorithms, the ECC algorithms may instead by 1-symbol ECC algorithms or 2-symbol ECC algorithms, respectively. Further, the actual ECC algorithms used may vary widely. Suitable ECC algorithms may include, but are not limited to, Reed-Solomon algorithms, Hamming code algorithms, and binary Hamming Code algorithms. For instance, in one embodiment, a suitable 1-bit ECC algorithm may be a Hamming code algorithm while a suitable 2-bit ECC algorithm may be a Reed-Solomon algorithm.

The steps associated with the various methods of the present invention may be widely varied. In general, steps may be added, removed, reordered, and altered without departing from the spirit or the scope of the present invention. For instance, the processes of initializing a memory system which includes a hybrid ECC implementation may include erasing static blocks. In addition, for embodiments in which reclaimed blocks may be used to store data, before determining whether a block has been reclaimed, it may first be determined whether the erase count for the block in question exceeds an erase count threshold. Therefore, the present examples are to be considered as illustrative and not restrictive, and the invention is not to be limited to the details given herein, but may be modified within the scope of the appended claims.

What is claimed is:

1. A method for storing data within a non-volatile memory comprised of a plurality of blocks in an array formed on a semiconductor substrate, each of the plurality of blocks having an indicator indicative of whether the block is a reclaimed block, the method comprising:
    identifying a first block of the plurality of blocks into which the data is to be stored;
    responsive to the indicator associated with the first block meeting a criterion, encoding the data using a first error detection algorithm;
    then writing the encoded data into the first block;
    identifying a second block of the plurality of blocks into which data is to be stored;
    responsive to the indicator associated with the second block not meeting the criterion, encoding the data using a second error detection algorithm, the second error detection algorithm having a higher error detection capability than the first error detection algorithm; and
    then writing the encoded data into the second block.

2. The method of claim 1 wherein the first error detection algorithm is a 1-bit error correction code (ECC) algorithm and the second error detection algorithm is a 2-bit ECC algorithm.

3. A method for storing data within a non-volatile memory, comprised a plurality of blocks in an array formed on a semiconductor substrate, of a memory system, the method comprising:
    identifying one of the plurality of blocks into which the data is to be stored;
    obtaining an indicator associated with the identified block, the indicator having a value indicative of a number of times the first block has been erased;
    determining whether the indicator is less than a threshold value,
    responsive to the indicator being less than the threshold value, encoding the data using the first algorithm and then writing the data encoded using a first error detection algorithm into the identified block;
    responsive to the indicator not being less than the threshold value, encoding the data using a second algorithm and then writing the data encoded using a second error detection algorithm into the identified block, the second error detection algorithm having a higher error detection capability than the first error detection algorithm;
    repeating the identifying, obtaining, determining, encoding, and writing steps for another block in the array;
    wherein, as a result of the repeating step, a first block in the array stores data encoded according to the first algorithm, and a second block in the array stores data encoded according to the second algorithm.

4. The method of claim 3 wherein the indicator has a value indicative of an approximately average number of times blocks within the non-volatile memory have been erased.

5. The method of claim 3 wherein the indicator is stored in a data structure, the data structure being substantially separate from the first block,
    and wherein obtaining the indicator associated with the block includes obtaining the indicator from the data structure.

6. The method of claim 3 wherein the non-volatile memory is a flash memory.

7. The method of claim 6 wherein the flash memory is one of a NAND flash memory and an MLC NAND flash memory.

8. The method of claim 3 further comprising:
    identifying the first block as a block from which data is to be read;
    obtaining the indicator associated with the first block;
    responsive to the indicator associated with the first block meeting a criterion, decoding the data stored in the first block using the first error detection algorithm; and
    responsive to the indicator associated with the first block not meeting the criterion, decoding the data using the second error detection algorithm.

9. The method of claim 8 wherein the first error detection algorithm is a 1-bit ECC algorithm and the second error detection algorithm is a 2-bit ECC algorithm.

10. A method for reading data within a non-volatile memory comprised of a plurality of blocks in an array formed on a semiconductor substrate, the method comprising:

identifying one of the plurality of blocks from which data is to be read;
obtaining an indicator associated with the identified block, the indicator having a value indicative of a number of times the identified block has been erased;
determining whether the indicator is less than a threshold value,
responsive to the indicator being less than the threshold value, decoding the data using a first error detection algorithm;
responsive to the indicator not being less than the threshold value, decoding the data using a second error detection algorithm, the second error detection algorithm having a higher error detection capability than the first error detection algorithm.

11. The method of claim 8 wherein the indicator has a value indicative of an approximately average number of times physical blocks of the non-volatile memory have been erased.

12. The method of claim 8 wherein the indicator is stored in a data structure, the data structure being substantially separate from the first block,
and wherein obtaining the indicator associated with the block includes obtaining the indicator from the data structure.

13. The method of claim 8 wherein the non-volatile memory is a flash memory.

14. The method of claim 13 wherein the flash memory is one of a NAND flash memory and an MLC NAND flash memory.

15. A memory system comprising:
a non-volatile memory array formed on a semiconductor substrate, the array including a plurality of blocks;
code devices for identifying a block into which data is to be stored;
code devices for obtaining an indicator associated with the identified block, the indicator having a value arranged to indicate whether the block is a reclaimed block;
code devices for encoding the data using a first error detection algorithm responsive to the indicator meeting a criterion, and for encoding the data using a second error detection algorithm responsive to the indicator not meeting the criterion, the second error detection algorithm having a higher error detection capability than the first error detection algorithm;
code devices for writing encoded data into the identified block; and
a memory area that stores the code devices.

16. The memory system of claim 15 wherein the first error detection algorithm is a 1-bit ECC algorithm and the second error detection algorithm is a 2-bit ECC algorithm.

17. A memory system comprising:
a non-volatile memory array formed on a semiconductor substrate, the array including a plurality of blocks;
code devices for identifying a block into which data is to be stored;
code devices for obtaining an indicator associated with the identified block, the indicator having a value indicative of a number of times the identified block has been erased;
code devices for determining whether the indicator is less than a threshold value,
code devices for encoding the data using a first algorithm responsive to—the indicator being less than the threshold value;
code devices for writing the data encoded using the first algorithm into the identified block;
code devices for encoding the data using a second algorithm responsive to determining that the data is not to be encoded using the first algorithm, the second error detection algorithm having a higher error detection capability than the first error detection algorithm;
code devices for writing the data encoded using the second algorithm into the identified block; and
a memory area that stores the code devices.

18. The memory system of claim 15 wherein the non-volatile memory is one of a NAND flash memory and an MLC NAND flash memory.

19. The memory system of claim 15, further comprising:
code devices for determining whether the indicator meets the criterion;
code devices for decoding the data using the first error detection algorithm responsive to the indicator meeting the criterion, and for decoding the data using the second error detection algorithm responsive to the indicator not meeting the criterion.

20. The memory system of claim 19 wherein the first error detection algorithm is a 1-bit ECC algorithm and the second error detection algorithm is a 2-bit ECC algorithm.

21. The memory system of claim 19 wherein the indicator is arranged to indicate whether the block is a reclaimed block.

22. The memory system of claim 19 wherein the indicator has a value indicative of a number of times the block has been erased.

23. A memory system comprising:
a non-volatile memory array formed on a semiconductor substrate, the array including a plurality of blocks, each including data;
code devices for identifying a block;
code devices for obtaining an indicator associated with the identified block, the indicator having a value indicative of a number of times the block has been erased;
code devices for determining whether the indicator is less than a threshold value,
code devices for decoding the data using a first error detection algorithm responsive to the indicator being less than the threshold value;
code devices for decoding the data using a second error detection algorithm responsive to the indicator not being less than the threshold value, the second error detection algorithm having a higher error detection capability than the first error detection algorithm; and
a memory area that stores the code devices.

24. The memory system of claim 19 wherein the non-volatile memory is one of a NAND flash memory and an MLC NAND flash memory.

* * * * *